United States Patent
Hsiao et al.

(10) Patent No.: US 7,596,309 B2
(45) Date of Patent: Sep. 29, 2009

(54) AUTO-FOCUSING CAMERA

(75) Inventors: Cheng-Fang Hsiao, Tu-Cheng (TW); Bing Zhou, Shenzhen (CN); Chien-Long Hong, Tu-Cheng (TW); Ching-Hsing Huang, Tu-Cheng (TW); Fong-Tan Yu, Tu-Cheng (TW)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 443 days.

(21) Appl. No.: 11/309,901

(22) Filed: Oct. 24, 2006

(65) Prior Publication Data

US 2008/0095524 A1     Apr. 24, 2008

(51) Int. Cl.
*G03B 3/10*     (2006.01)
*G02B 7/02*     (2006.01)

(52) U.S. Cl. .................. 396/133; 359/824; 359/829
(58) Field of Classification Search .................. 396/133, 396/532; 359/811, 817; 348/335, 340
See application file for complete search history.

(56) References Cited

U.S. PATENT DOCUMENTS

| | | | |
|---|---|---|---|
| 4,905,031 A * | 2/1990 | Mody | 396/133 |
| 7,039,309 B2 | 5/2006 | Hsiao | |
| 2002/0034022 A1 * | 3/2002 | Nakamura | 359/819 |
| 2002/0050907 A1 * | 5/2002 | Szu-Lu et al. | 336/192 |
| 2002/0057168 A1 * | 5/2002 | Yeh et al. | 336/192 |
| 2002/0065102 A1 * | 5/2002 | Miyake et al. | 455/556 |
| 2004/0075519 A1 * | 4/2004 | Lopez et al. | 336/192 |
| 2006/0066746 A1 | 3/2006 | Lee et al. | |
| 2007/0223903 A1 * | 9/2007 | Ho et al. | 396/85 |
| 2008/0013196 A1 * | 1/2008 | Shyu et al. | 359/824 |

* cited by examiner

*Primary Examiner*—Rochelle-Ann J Blackman
*Assistant Examiner*—Leon W Rhodes
(74) *Attorney, Agent, or Firm*—Frank R. Niranjan

(57) ABSTRACT

An auto-focusing camera includes a lens mount (10), a lens unit (50) received in the lens mount, and a motor for driving the lens unit. The lens mount has a pair of connecting pins (22, 21) extending therethrough for electrically connecting to a printed circuit board arranged under the lens mount. The motor includes at least one coil seat (30, 40) with coil (35, 45) wound thereon, and a permanent magnet (55) being fixedly mounted around the lens unit to move with the lens unit. The at least one coil seat includes a pair of mounting pins (32, 43, 33, 41) for guiding two ends of the coils to be connected to the two connecting pins of the lens mount.

14 Claims, 5 Drawing Sheets

AUTO-FOCUSING CAMERA

FIELD OF THE INVENTION

The present invention relates generally to a drive source of a camera, and more particularly to a drive source of two-step auto-focusing camera.

DESCRIPTION OF RELATED ART

Conventionally, an auto-focus structure is used for controlling the telescopic movement of a lens of the camera. Auto-focus structures are used to automatically produce high-quality images with minimum user effort, and as such are important part of a modern camera.

The auto-focus structure of the camera focuses on an object by analyzing the image on an image sensor. The image sensor is either a charge coupled device (CCD) sensor or a complementary metal oxide semiconductor (CMOS) sensor, and is controlled by a central processing unit (CPU) installed inside the digital camera. The auto-focus structure operates by moving the lens back and forth around its original (static) position. As the lens moves, the CPU compares the image from the lens with the image in the image sensor. Finally, as the lens moves to the position where the image is fully in focus, and the lens then stops in that position. In this case, the lens has to be continuously driven back and forth by a motor structure. Generally the motor structure is column-shaped, including coils wound therearound and a permanent magnet mounted around the lens. During operation of the motor, a current is applied to the coils to establish an alternating magnetizable field. The magnetic field of the permanent magnet interacts with the alternating magnetic field of the coils to drive the lens to move. At the moment when the CPU detects a focused image as the lens moves back and forth, a stop signal is simultaneously sent to the motor. Therefore, the lens stops at the best focal position (static position).

A pin holder for connecting the coils with a power source to provide the current to the coils to drive the motor into operation is formed on a side of the motor. A plurality of pins are received in the pin holder and connect with ends of the coils to electrically connect the ends of the coils to the power source. However, the pins are formed on the cylinder of the motor for the column shape of the motor. Then wiring is needed to electrically connect the ends of the coils to a printed circuit board which is arranged under the motor. Thus the coils are electrically connected to the power source by the wiring. As the size of the motor is limited, it is not easy to connect the wiring to the coils and the printed circuit board, which causes production and assembly of the motor to be costly and awkward.

SUMMARY OF THE INVENTION

According to a preferred embodiment of the present invention, an auto-focusing camera includes a lens mount, a lens unit received in the lens mount, and a motor for driving the lens unit to move. The lens mount includes a pair of connecting pins extending therethrough for electrically connecting to a printed circuit board arranged under the lens mount. The motor includes at least one coil seat with coil wound thereon, and a permanent magnet being fixedly mounted around the lens unit to move with the lens unit. The at least one coil seat includes a pair of mounting pins guiding two ends of the coil to be connected to the pair of connecting pins of the lens mount.

Other advantages and novel features of the present invention will be drawn from the following detailed description of a preferred embodiment of the present invention with attached drawings, in which:

BRIEF DESCRIPTION OF THE DRAWINGS

Many aspects of the present auto-focusing camera can be better understood with reference to the following drawings. The components in the drawings are not necessarily drawn to scale, the emphasis instead being placed upon clearly illustrating the principles of the present auto-focusing camera. Moreover, in the drawings, like reference numerals designate corresponding parts throughout the several views.

DETAILED DESCRIPTION OF THE INVENTION

Figure 1:
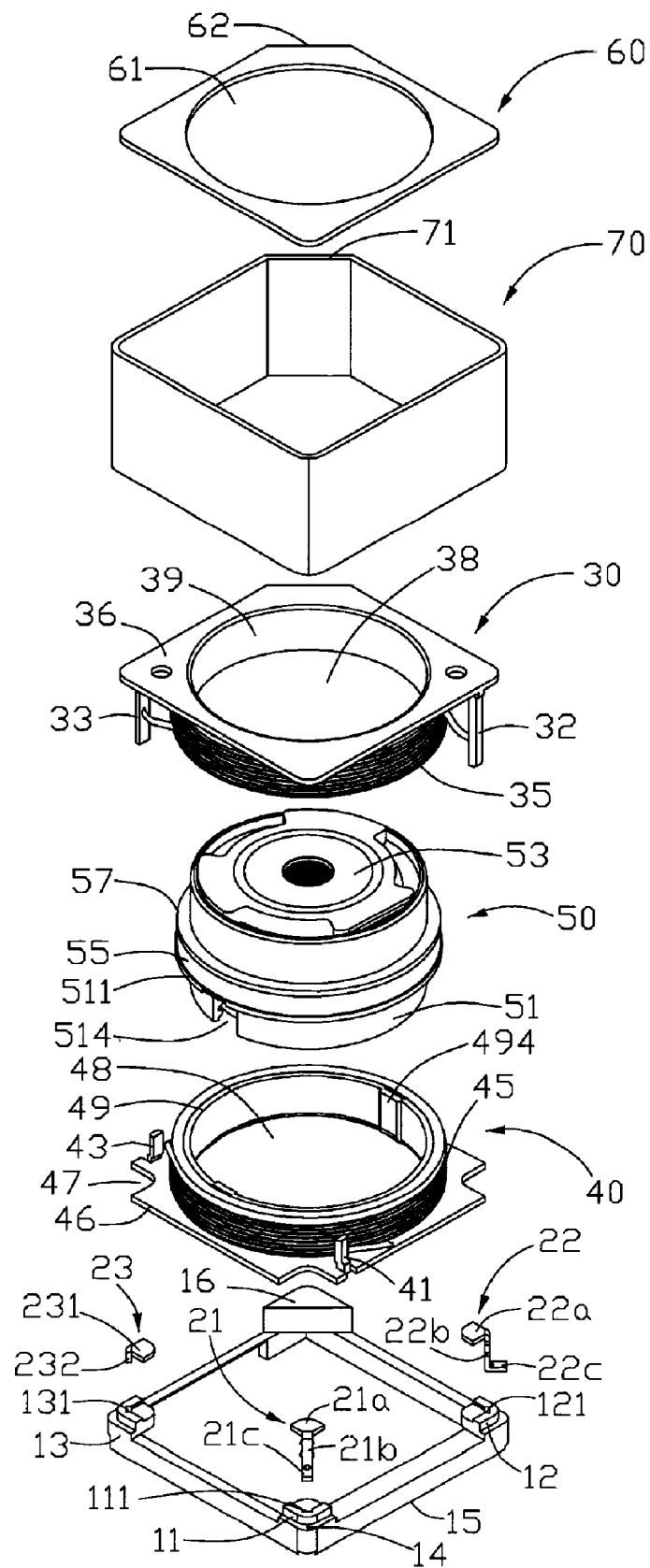
FIG. 1 is an isometric, exploded view of an auto-focusing camera in accordance with a preferred embodiment of the present invention.
Figure 2:
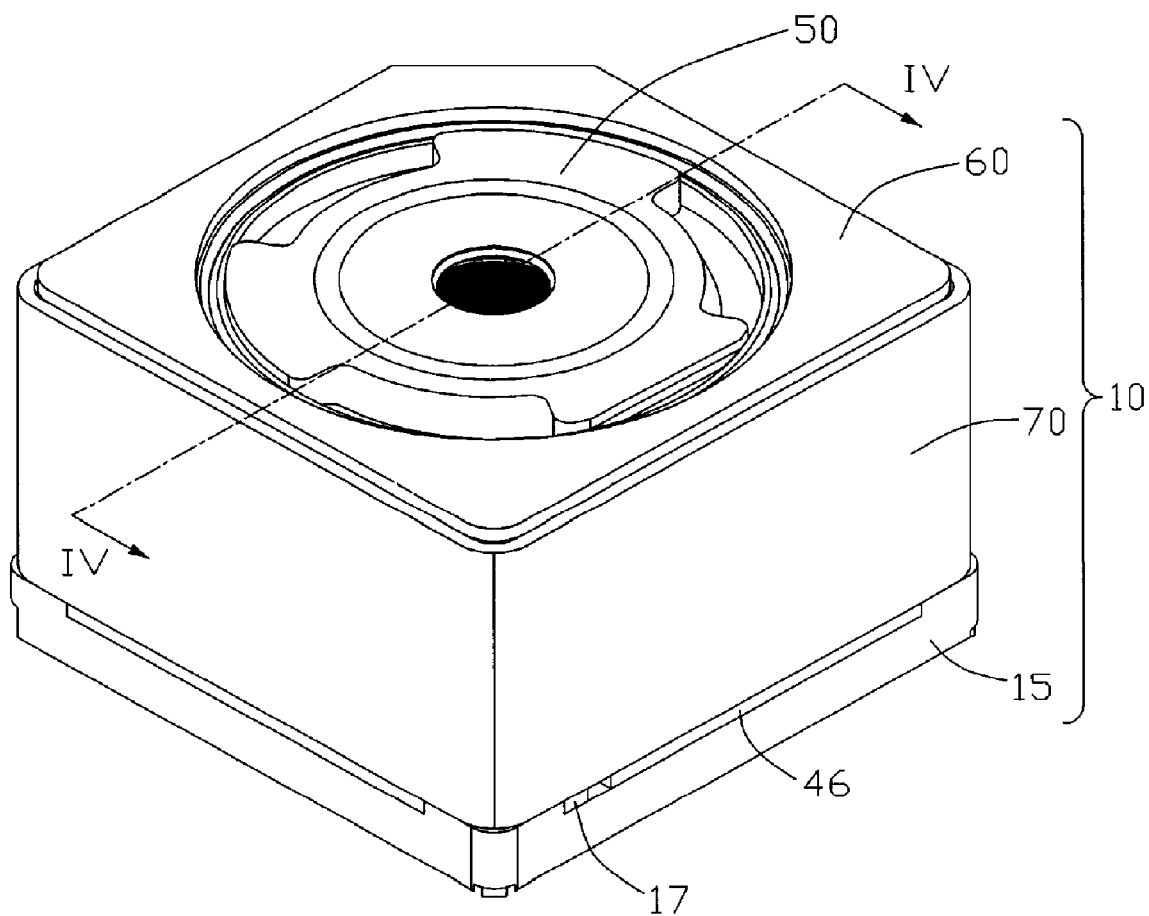
FIG. 2 is an assembled view of FIG. 1.
Figure 3:
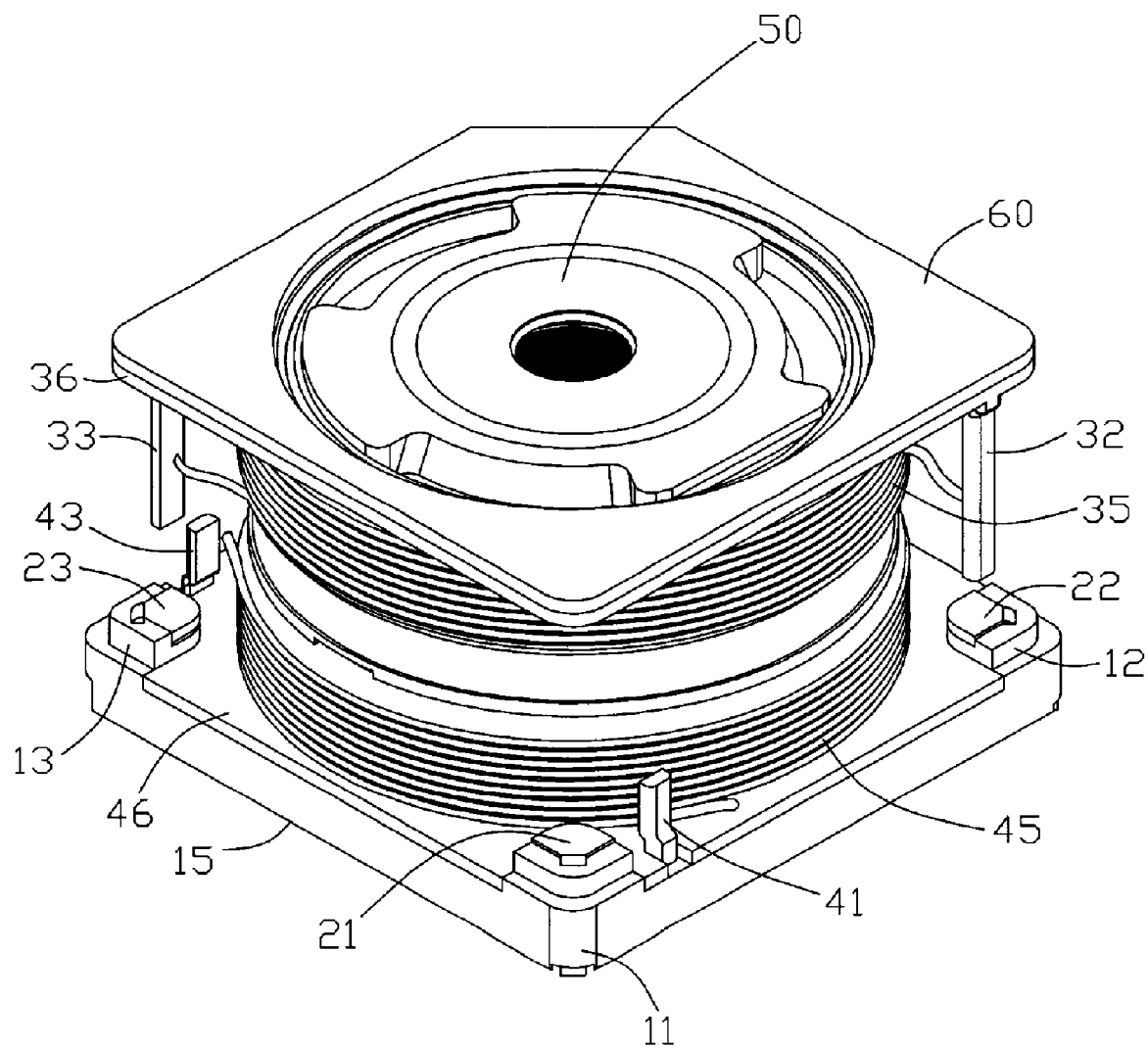
FIG. 3 is similar to FIG. 2, but showing the auto-focusing camera without a sidewall.

Referring to FIGS. 1 through 4, an auto-focusing camera includes a lens mount 10, a lens unit 50 received in the lens mount 10, and a motor (not labeled) for driving the lens unit 50 into telescopic movement.

The lens mount 10 includes a base 15, a sidewall 70, and a cover 60. The base 15 is square-shaped and defines an opening (not labeled) therein. Each of the four corners of the base 15 forms a protrusion thereon, which form in sequence the first protrusion 11, the second and third protrusions 12, 13 neighboring the first protrusion 11, and the fourth protrusion 16. The first and fourth protrusions 11, 16 are located on a diagonal of the base 15. The first and second protrusions 11, 12 define first and second through holes 111, 121 for extension of first and second connecting pin 21, 22 therethrough, respectively. The connecting pins 21, 22 are "Z"-shaped, each including an upper portion 21a, 22a, a middle portion 21b, 22b and a lower portion 21c, 22c. The middle portions 21b, 22b are received in the through holes 111, 121, respectively. The upper portions 21a, 22a extend horizontally inwardly to electrically connect to the motor. Each upper portion 21a, 22b is sector-shaped and abuts a top portion of the corresponding protrusion 11, 12. The lower portions 21c, 22c extend horizontally outwardly to electrically connect to a printed circuit board (not shown) which is arranged under the base 15 of the lens mount 10. A blind hole 131 is defined in the third protrusion 13, receiving a third connecting pin 23 therein. The third connecting pin 23 has an inverted L-shaped profile and includes a lower portion 232 received in the blind hole 131 and an upper portion 231 bending from the lower portion 232. The upper portion 231 of the third connecting pin 23 is sector-shaped and abuts a top portion of the third protrusion 13. A step 14 is defined in an outer-periphery of each of the first, second and third protrusions 11, 12, 13.

The sidewall 70 is approximately a hollow regular prism. A cutout 71 is defined in a corner thereof corresponding to the fourth protrusion 16 of the base 15. When the sidewall 70 is mounted on the base 15, the corner having the cutout 71 abuts against an inner-periphery of the fourth protrusion 16 of the base 15. The other three corners of the sidewall 70 are respectively supported by the steps 14 of the first, second, and third protrusions 11, 12, 13 and abut against the outer-peripheries thereof. Thus the sidewall 70 is fixedly mounted on the base 15. A narrow gap 17 is defined between the sidewall 70 and the base 15. The cover 60 is arranged on a top of the sidewall 70. Cooperatively the base 15, the sidewall 70 and the cover 60 define a space (not labeled) receiving the lens unit 50 and the motor therein. An aperture 61 is defined in the cover 60 for telescopic extension of the lens unit 50 therethrough. Also a cutout 62 is defined in the cover 60 corresponding to the cutout 71 of the sidewall 70.

The lens unit 50 is approximately column-shaped and has an outer diameter approximately the same as a diameter of the aperture 61 of the cover 60. The lens unit 50 includes a lens base 51 and a lens 53 fixedly mounted in the lens base 51. The lens base 51 forms an inner thread 512 (FIG. 4) on an inner surface thereof, and the lens 53 forms an outer thread 532 (FIG. 4) on an outer surface thereof, which threadedly engages with the inner thread 512 of the lens base 51. A pair of grooves 514 are defined in a bottom end of the lens unit 50. When the lens unit 50 is received in the lens mount 10, an interspace is defined therebetween for receiving the motor. The motor includes a permanent magnet 55 mounted around the lens base 51 and attached to a middle of an outer surface of the lens base 51, and upper and lower coil seats 30, 40 being arranged at upper and lower sides of the magnet 55, respectively. An upper magnetically insulating layer 57 is sandwiched between the upper coil seat 30 and the upper side of the magnet 55. A lower magnetically insulating layer 511 is arranged between the lower coil seat 40 and the lower side of the magnet 55. The insulating layers 57, 511 are made of non-magnetic materials, such as copper. The two insulating layers 57, 511 are adhered to the upper and lower sides of the magnet 55, respectively.

The coil seats 30, 40 are made of magnetizable materials, such as iron. Each of the coil seats 30, 40 includes a square-shaped base wall 36, 46 defining a circular hole 38, 48 in a central portion thereof. An annular flange 39, 49 extends perpendicularly from an inner circumference of each base wall 36, 46 for coils 35, 45 to be wound thereon. A pair of blocks 494 are formed on an inner surface of the flange 49 of the lower coil seat 40 corresponding to the grooves 514 of the lens unit 50. A notch 47 is defined in each corner of the lower base wall 46 corresponding to each protrusion 11, 12, 13, 16 of the base 15. The base walls 36, 46 of the upper and lower coil seats 30, 40 each form two mounting pins (i.e., positive mounting pin 32, 43 and negative mounting pin 33, 41) thereon. The mounting pins 32, 33 are integrally formed with the base wall 36 and extend perpendicularly downwardly therefrom. The mounting pins 41, 43 are integrally formed with the base wall 46 and extend perpendicularly upwardly therefrom. The two mounting pins 32, 33 of the upper base wall 36 are formed at a diagonal thereof, and the two mounting pins 43, 41 of the lower base wall 46 are formed at two neighboring corners thereof. The height of the upper mounting pins 32, 33 is approximately the same as that of the motor, and the upper mounting pins 32, 33 have free ends near the second and third protrusions 12, 13 of the base 15 when the motor is mounted into the lens mount 10. The height of the lower mounting pins 43, 41 is much smaller than that of the upper mounting pins 32, 33, being approximately the same as that of the third and first protrusions 13, 11 of the base 15.

The upper and lower coils 35, 45 are wound around the flanges 39, 49 of the upper and lower coil seats 30, 40, respectively. Each coil 35, 45 forms two ends (i.e., upper and lower ends) to be connected to the mounting pins 32, 43, 33, 41 of the corresponding base wall 36, 46, respectively. The upper positive mounting pin 32 connects to the upper end of the upper coil 35, and the upper negative mounting pin 33 connects to the lower end of the upper coil 35. Whilst the lower positive mounting pin 43 connects to the upper end of the lower coil 45, and the lower negative mounting pin 41 connects to the lower end of the lower coil 45. The upper and lower coils 35, 45 are wound in opposite directions. In this embodiment, the upper coil 35 is wound clockwise, whilst the lower coil 45 is wound anti-clockwise. Alternatively, the upper coil 35 can be wound anti-clockwise, and the lower coil 45 wound clockwise.

When assembled, the magnet 55 is fixedly adhered to the middle of the outer surface of the lens base 51 of the lens unit 50. The lens unit 50 with the magnet 55 is then movably received in the space of the lens mount 10. The upper and lower coil seats 30, 40 with upper and lower coils 35, 45 wound thereon are received in the interspace formed between the lens unit 50 and the lens mount 10, and are arranged on the upper and lower sides of the magnet 55, respectively. The lower base wall 46 is received in the gap 17 between the base 15 and the sidewall 70 of the lens mount 10. The protrusions 11, 12, 13, 16 of the base 15 engage into the notches 47 of the lower base wall 46. The blocks 494 of the lower coil seat 40 engage into the grooves 514 of the lens unit 50 to prohibit rotation of the lens unit 50. The upper positive mounting pin 32 is located corresponding to the position of the second protrusion 12 of the base 15, and the upper negative mounting pin 33 corresponds to the position of the third protrusion 13 of the base 15. The positive mounting pin 43 of the lower coil seat 40 is located corresponding to the position of the third protrusion 13 of the base 15, and the negative mounting pin 41 of the lower coil seat 40 corresponds to position of the first protrusion 11 of the base 15. Then the ends of the coils 35, 45 are connected to the upper portions 22a, 21a, 231 of corresponding connecting pins 22, 21, 23 of the base 15 by welding. The upper end of the upper coil 35 connected to the upper positive mounting pin 32 is connected to the upper portion 22a of the second connecting pin 22. The lower end of the lower coil 45 connected to the lower negative mounting pin 41 is connected to the upper portion 21a of the first connecting pin 21. The lower end of the upper coil 35 connected to the upper negative mounting pin 33 and the upper end of the lower coil 45 connected to the lower positive mounting pin 43 are connected to the upper portion 231 of the third connecting pin 23. As the pins 32, 43, 33, 41 of the coil seats 30, 40 are arranged near the protrusions 11, 12, 13 of the base 15, the ends of the coils 35, 45 connected to the mounting pins 32, 43, 33, 41 of the coil seats 30, 40 can easily be connected to the connecting pins 22, 21, 23 of the base 15. In other words, the coils 35, 45 can easily be electrically connected to the power source, and wiring which is used to interconnect the coils and the power source of a conventional camera is avoided. As a result the cost of the camera is reduced, and assembly of the camera is made easier.

Figure 4:
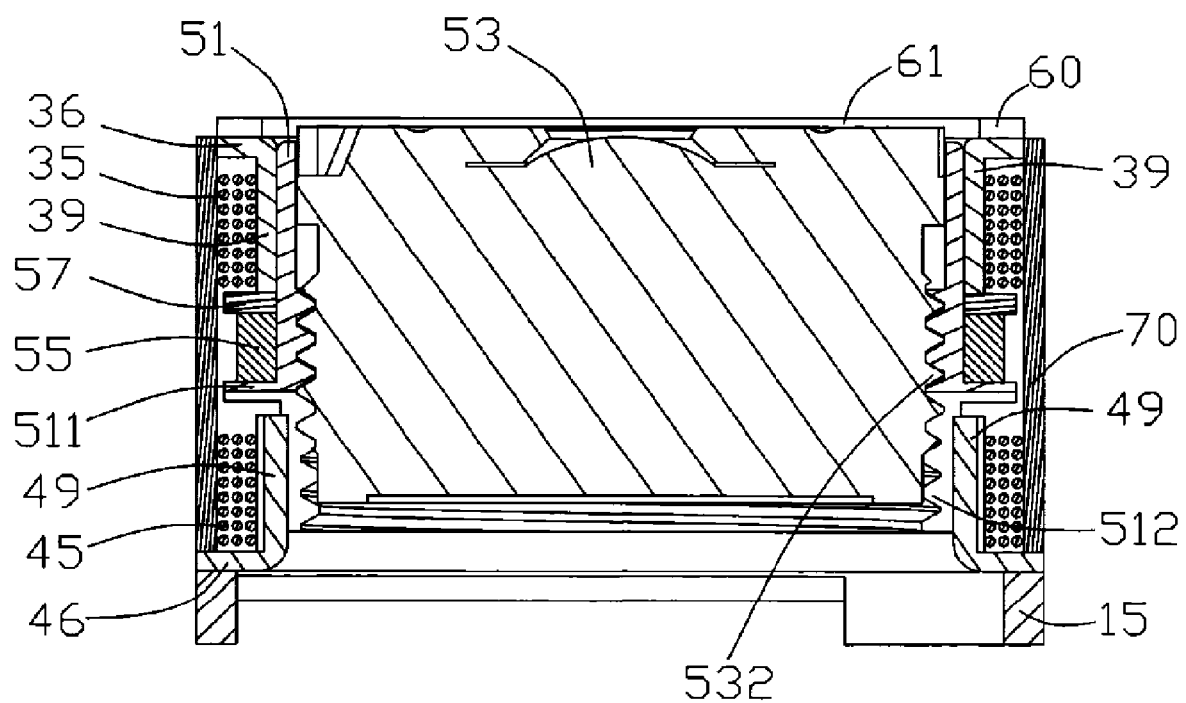
FIG. 4 shows a cross-sectional view of the auto-focusing camera of FIG. 2, taken along line IV-IV thereof.

During operation, the lower portion 22c of the second connecting pin 22 connects to the printed circuit board so as to be electrically connected to a positive pole of a power source, and the lower portion 21c of the first connecting pin 21 connects to the printed circuit board to be electrically connected to a negative pole of the power source. Thus a current is applied to the coils 35, 45 through the connecting pins 22, 21. As shown in FIG. 4, assuming the upper side of the magnet 55 is N (north pole), and the lower side of the magnet 55 is S (south pole). The lens unit 50 is at its front focal point initially. The flange 39 of the upper coil seat 30 abuts the upper insulating layer 57, whilst the flange 49 of the lower coil seat 40 is separated by a space from the lower insulating layer 511. A distance is thus defined between the lower coil seat 40 and the lower insulating layer 511. When current is applied to the upper and lower coils 35, 45, induced magnetic fields established by the two coils 35, 45 have polarities opposite to each other due to the opposite winding directions thereof. The induced magnetic field of the upper coil 35 has polarities opposite to that of the magnet 55. A top end of the upper coil seat 30 near the cover 60 of the lens mount 10 is S, whilst a bottom end of the upper coil seat 30 near the upper side of the magnet 55 is N. The induced magnetic field of the lower coil 45 has a similar polarity to that of the magnet 55. A bottom end of the lower coil seat 40 positioned near the base 15 of the lens mount 10 is S, whilst a top end of the lower coil seat 40 positioned near the lower side of the magnet 55 is N. Thus an attractive force is generated between the lower coil seat 40 and the magnet 55, whilst a repelling force is generated between the upper coil seat 30 and the magnet 55. The lens unit 50 with the magnet 55 fixedly mounted thereon moves downwardly to its rear focal point from the bottom end of the upper coil seat 30 to the top end of the lower coil seat 40. Since the coil seats 30, 40 are made of magnetic material, no current is needed after the lens unit 50 stops at the rear focal point. The insulating layers 57, 511 are provided to modulate the magnetically interacting force between the permanent magnet 55 and the upper coil seat 30 and between the permanent magnet 55 and the lower coil seat 40 so that the lens 50 unit can move smoothly and accurately to reach its required position.

When the lens unit 50 is at the rear focal point and moves to the front focal point, the directions of the currents applied to the coils 35, 45 can be switched. The second connecting pin 22 thus electrically connects to the negative pole of the power source, and the first connecting pin 21 electrically connects to the positive pole of the power source. The polarities of the upper and lower coil seats 30, 40 are switched according to the currents. The induced magnetic field of the upper coil 35 has polarities similar to that of the magnet 55. The top end of the upper coil seat 30 is N, whilst the bottom end of the upper coil seat 30 is S. The induced magnetic field of the lower coil 45 has a polarity substantially opposite to that of the magnet 55. The bottom end of the lower coil seat 40 is N, whilst the top end of the lower coil seat 40 is S. Attractive force is generated between the upper coil seat 30 and the magnet 55, and repelling force is generated between the lower coil seat 40 and the magnet 55. The lens unit 50 with the magnet 55 moves upwardly to its front focal point from the top end of the lower coil seat 40 to the bottom end of the upper coil seat 30 under the attractive force of the upper coil seat 30 and the repelling force of the lower coil seat 40. Also the upper coil seat 30 provides an attractive force to the magnet 55 to keep the lens unit 50 at its front focal point.

Figure 5:
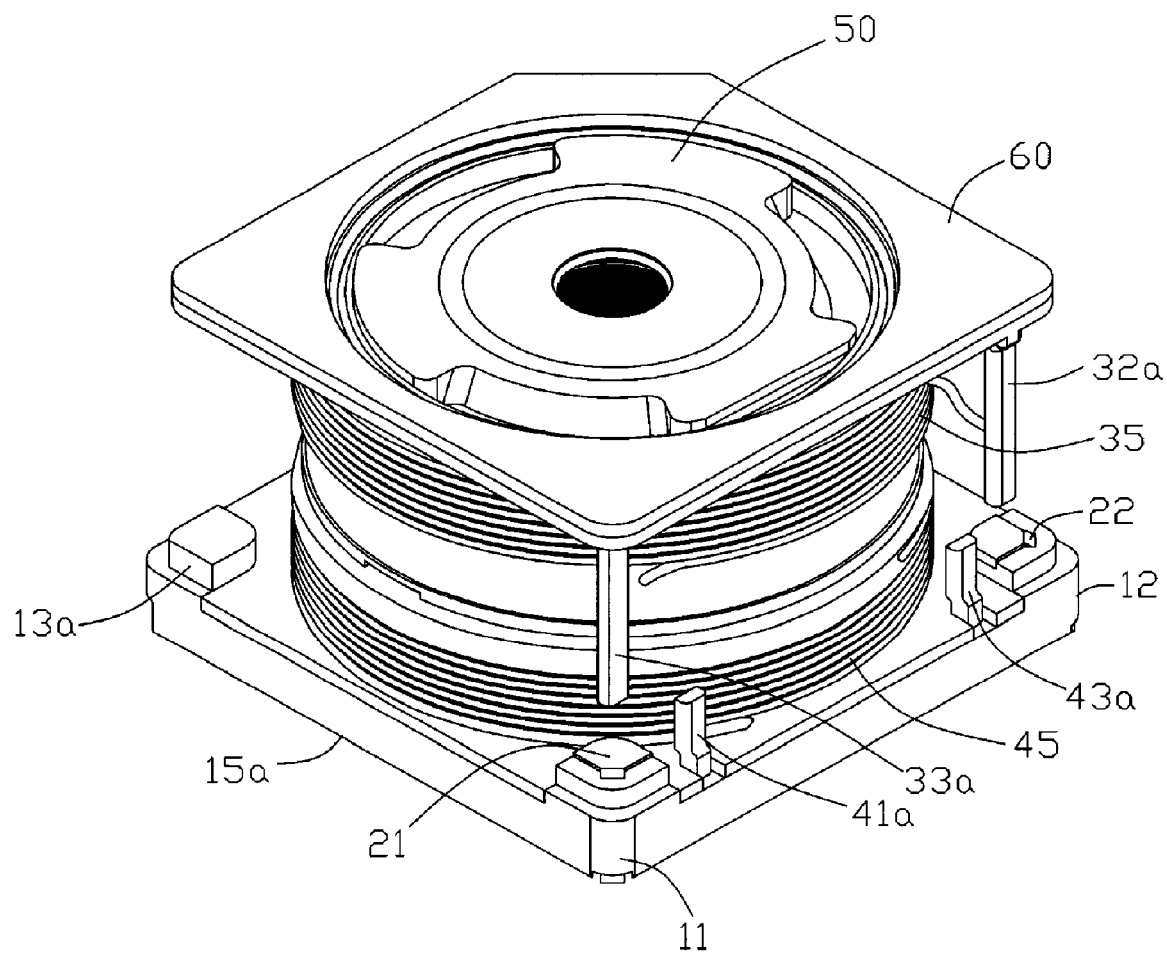
FIG. 5 shows an alternative embodiment of the auto-focusing camera.

FIG. 5 illustrates the auto-focusing camera in accordance with an alternative embodiment. Similar to the first embodiment, the auto-focusing camera also includes a lens mount having a base 15a, a motor arranged on the base 15a, and a lens unit 50 driven by the motor. Also the base 15a forms a protrusion in each corner thereof. The difference of the second embodiment over the first embodiment is that only the first and second protrusions 11, 12 of the base 15a have connecting pins 21, 22. The third protrusion 13a does not define the blind hole 131 of the first embodiment. The third connecting pin 23 of the first embodiment is also omitted in this embodiment. The lower coil seat of the motor forms two mounting pins 43a, 41a at two neighboring corners thereof. The upper coil seat of the motor also forms two mounting pins 32a, 33a at two neighboring corners thereof. During assembly, the upper ends of the two coils 35, 45 connect to the positive mounting pins 32a, 43a of the upper and lower coil seats, respectively. The lower ends of the two coils 35, 45 connect to the negative mounting pins 33a, 41a of the upper and lower coil seats, respectively. Then the upper ends of the two coils 35, 45 are connected to the second connecting pin 22, and the lower ends of the two coils 35, 45 are connected to the first connecting pin 21 of the base 15a. Thus the two coils 35, 45 establish induced magnetic fields of opposite polarities when a current is applied. The lens unit 50 is thus driven into telescopic movement by the attractive force and repelling force of the two coil seats. In the previous embodiments, the coils 35, 45 are wound in opposite directions to establish induced magnetic fields of opposite polarities.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An auto-focus camera comprising:
  a lens mount having a pair of connecting pins extending therethrough for electrically connecting to a printed circuit board arranged under the lens mount;
  a lens unit received in the lens mount; and
  a motor received in the lens mount for driving the lens unit to move, the motor comprising a permanent magnet being fixedly mounted around the lens unit to move with the lens unit, and at least one coil seat with a coil wound thereon, the at least one coil seat comprising a pair of mounting pins for guiding two ends of the coil to be connected to the two connecting pins of the lens mount;
  wherein the at least one coil seat comprises a base wall and an annular flange extending perpendicularly from an inner circumference of the base wall, the coil being wound on the flange, the mounting pins extending perpendicularly from the base wall; and
  wherein the lens mount comprises a base, a cover and a sidewall arranged between the base and the cover, each corner of the base forming a protrusion engaging with the base wall of the at least one coil seat, the pair of connecting pins extending through two of the protrusions of the base of the lens mount, respectively.

2. The auto-focus camera as claimed in claim 1, wherein the at least one coil seat comprises a first coil seat with a first coil wound thereon arranged on a first side of the magnet, and a second coil seat with a second coil wound thereon arranged on a second side opposite to the first side of the magnet.

3. The auto-focus camera as claimed in claim 2, wherein the two ends of each coil connect to the two connecting pins, respectively.

4. The auto-focus camera as claimed in claim 2, further comprising a third connecting pin, each coil having one end connecting to the third pin, the other two ends of the coils connecting to the two connecting pins of the lens mount, respectively.

5. The auto-focus camera as claimed in claim 4, wherein the lens mount defines two through holes in the two of the protrusions of the base for extension of the pair of connecting pins therethrough, and a blind hole receiving the third pin therein.

6. The auto-focus camera as claimed in claim 4, wherein one of the mounting pins of each coil seat is located corresponding to a position of the third connecting pin, and the other two mounting pins of the two coil seats are located corresponding to respective locations of the pair of connecting pins.

7. The auto-focus camera as claimed in claim 6, wherein the lens mount is square-shaped, the mounting pins of the first coil seat are located corresponding to two neighboring corners of the lens mount, the mounting pins of the second coil seat are located corresponding to two diagonal corners of the lens mount.

8. The auto-focus camera as claimed in claim 1, wherein the base wall of the at least one coil seat is square-shaped, each corner of the base wall defining a notch receiving a corresponding protrusion of the base of the lens mount therein.

9. The auto-focus camera as claimed in claim 1, wherein each connecting pin is "Z"-shaped, comprising an upper portion connecting to the end of the coil, a lower portion for connecting to the printed circuit board, and a middle portion interconnecting the upper and lower portions.

10. A motor structure with built-in lens, comprising:
a lens unit;
a permanent magnet mounted around the lens unit;
an upper coil seat with an upper coil wound thereon arranged at an upper side of the magnet;
a lower coil seat with a lower coil wound thereon arranged at a lower side of the magnet; and
a base on which the lower coil seat is mounted thereon, the base having a pair of connecting pins for electrically connecting to positive and negative poles of a power source, respectively;
wherein each coil seat has a pair of mounting pins being connected to the corresponding two ends of the coil, guiding the ends of the coil to be connected to the connecting pins of the base; and
wherein the two ends of each coil connect to the two connecting pins, respectively.

11. A motor structure with built-in lens, comprising:
a lens unit;
a permanent magnet mounted around the lens unit;
an upper coil seat with an upper coil wound thereon arranged at an upper side of the magnet, the upper coil seat forming a pair of mounting pins connected to the corresponding two ends of the upper coil, respectively;
a lower coil seat with a lower coil wound thereon arranged at a lower side of the magnet, the lower coil seat forming a pair of mounting pins connected to the corresponding two ends of the lower coil, respectively; and
a base on which the lower coil seat is mounted thereon, the base having a pair of connecting pins and a third connecting pin, the pair of connecting pins being adapted for electrically connecting to positive and negative poles of a power source, respectively, each of the upper and lower coils having one end connecting to the third connecting pin, the other ends of the two coils connecting to the pair of connecting pins, respectively.

12. The motor structure as claimed in claim 11, wherein the base defines two through holes for extension of the pair of connecting pins therethrough, and a blind hole receiving the third pin therein.

13. The motor structure as claimed in claim 12, wherein one of the mounting pins of each coil seat is located corresponding to a position of the third connecting pin, and the other two mounting pins of the two coil seats are located corresponding to respective locations of the pair of connecting pins.

14. The motor structure as claimed in claim 13, wherein the base is square-shaped, the mounting pins of the first coil seat are located corresponding to two neighboring corners of the base, and the mounting pins of the second coil seat are located corresponding to two diagonal corners of the base.

* * * * *